(12) United States Patent
Kaneichi et al.

(10) Patent No.: US 11,574,350 B2
(45) Date of Patent: Feb. 7, 2023

(54) CREDIBILITY EVALUATION DEVICE, METHOD OF EVALUATING CREDIBILITY, AND COMPUTER READABLE RECORDING MEDIUM

(71) Applicants: TOYOTA JIDOSHA KABUSHIKI KAISHA, Toyota (JP); Nomura Research Institute, Ltd., Tokyo (JP)

(72) Inventors: Daiki Kaneichi, Nisshin (JP); Naoya Sugita, Tokyo-to (JP)

(73) Assignees: TOYOTA JIDOSHA KABUSHIKI KAISHA, Toyota (JP); NOMURA RESEARCH INSTITUTE, LTD., Tokyo (JP)

( * ) Notice: Subject to any disclaimer, the term of this patent is extended or adjusted under 35 U.S.C. 154(b) by 131 days.

(21) Appl. No.: 16/587,257

(22) Filed: Sep. 30, 2019

(65) Prior Publication Data
US 2020/0118185 A1    Apr. 16, 2020

(30) Foreign Application Priority Data

Oct. 10, 2018    (JP) .............................. JP2018-192081

(51) Int. Cl.
*G06Q 30/06*    (2012.01)
*G06Q 50/30*    (2012.01)
(Continued)

(52) U.S. Cl.
CPC ......... *G06Q 30/0609* (2013.01); *G06Q 50/30* (2013.01)

(58) Field of Classification Search
CPC .............. G06Q 30/0609; G06Q 50/30; G06Q 10/06393
(Continued)

(56) References Cited

U.S. PATENT DOCUMENTS

| 2014/0058761 A1* | 2/2014 | Freiberger ......... G06Q 10/0639 |
| | | 705/4 |
| 2015/0213420 A1* | 7/2015 | Krishnamurthy ...... G06Q 20/10 |
| | | 705/39 |

(Continued)

FOREIGN PATENT DOCUMENTS

| CN | 108109041 A | 6/2018 |
| JP | 2012-164210 A | 8/2012 |

(Continued)

OTHER PUBLICATIONS

Anderson, Tom; "More auto insurers want to track your driving behavior in exchange for lower rates"; Oct. 23, 2016. (Year: 2016).*

*Primary Examiner* — Resha Desai
*Assistant Examiner* — Dione N. Simpson
(74) *Attorney, Agent, or Firm* — Oliff PLC (57) ABSTRACT

A credibility evaluation device for evaluating a credibility of a user who uses a service provided by a communicable structure includes a processor including hardware. The processor is configured to: acquire structure information on the structure during and after use of the service by the user and third-party evaluation information including evaluation about the structure made by a third party other than the user after use of the service by the user; and calculate the credibility of the user, based on at least one of the structure information and the third-party evaluation information.

6 Claims, 8 Drawing Sheets

(51) Int. Cl.
*G06Q 10/06* (2012.01)
*G06Q 30/0601* (2023.01)

(58) Field of Classification Search
USPC .......................................................... 705/13
See application file for complete search history.

(56) References Cited

U.S. PATENT DOCUMENTS

| | | | |
|---|---|---|---|
| 2016/0205238 A1* | 7/2016 | Abramson | G08G 1/0137 |
| | | | 455/456.4 |
| 2017/0148231 A1* | 5/2017 | Cawse | G08G 1/0112 |
| 2017/0213137 A1* | 7/2017 | Geller | G01C 21/3469 |
| 2018/0268473 A1 | 9/2018 | Um et al. | |
| 2019/0287166 A1* | 9/2019 | Mitsumaki | G07C 5/085 |
| 2021/0366042 A1 | 11/2021 | Yuza et al. | |

FOREIGN PATENT DOCUMENTS

| | | | |
|---|---|---|---|
| JP | 2013-054538 A | | 3/2013 |
| JP | 2015-097014 A | | 5/2015 |
| JP | 201423533 | * | 8/2015 |
| JP | 201552954 | * | 8/2015 |
| JP | 2015152954 | * | 8/2015 |
| JP | 5803799 B2 | * | 11/2015 |
| WO | 2018-179154 A1 | | 10/2018 |

* cited by examiner

| USER IDENTIFICATION INFORMATION | EVALUATION SCORE | | | | | | | | | |
|---|---|---|---|---|---|---|---|---|---|---|
| | CREDIT SCORE | DRIVING BEHAVIOR SCORE | DISTRACTED DRIVING SCORE | TERMINAL OPERATION SCORE | TAILGATING SCORE | VEHICLE INTERIOR/ EXTERIOR SCORE | REMAINING FUEL AMOUNT SCORE | RETURN POSITION SCORE | DELAY-RELATED SCORE | THIRD-PARTY EVALUATION SCORE |
| | $x_0$ | $x_1$ | $x_2$ | $x_3$ | $x_4$ | $x_5$ | $x_6$ | $x_7$ | $x_8$ | $x_9$ |
| UID1 | 80 | 5 | 10 | 4 | 10 | 10 | 9.9 | 9.5 | 10 | 10 |
| UID2 | 65 | 10 | 10 | 5 | 10 | 10 | 8.4 | 6.2 | 4 | 5 |
| UID3 | 50 | 7 | 10 | 9 | 9 | 4 | 9.5 | 3.3 | 2 | 7 |
| UID4 | 45 | 8 | 8 | 10 | 9 | 8 | 6.2 | 4.3 | 1 | 2 |
| UID5 | 30 | 5 | 4 | 5 | 2 | 6 | 4.8 | 5.1 | 6 | 10 |
| ... | ... | ... | ... | ... | ... | ... | ... | ... | ... | ... |

FIG.9

| SERVICE TYPE | WEIGHTING COEFFICIENT ||||||||||
| --- | --- | --- | --- | --- | --- | --- | --- | --- | --- |
| | CREDIT SCORE | DRIVING BEHAVIOR SCORE | DISTRACTED DRIVING SCORE | TERMINAL OPERATION SCORE | TAILGATING SCORE | VEHICLE INTERIOR/ EXTERIOR SCORE | REMAINING FUEL AMOUNT SCORE | RETURN POSITION SCORE | DELAY-RELATED SCORE | THIRD-PARTY EVALUATION SCORE |
| CAR SHARING | A0 | A1 | A2 | A3 | A4 | A5 | A6 | A7 | A8 | A9 |
| RIDE SHARING | B0 | B1 | B2 | B3 | B4 | 0 | 0 | 0 | B8 | B9 |
| CAR RENTAL | C0 | C1 | C2 | C3 | C4 | C5 | C6 | 0 | C8 | C9 |
| UNMANNED-AERIAL-VEHICLE RENTAL | D0 | D1 | 0 | 0 | 0 | D5 | D6 | D7 | D8 | D9 |
| ACCOMMODATION-VEHICLE RENTAL | E0 | 0 | 0 | 0 | 0 | E5 | E6 | E7 | E8 | E9 |
| AUTONOMOUS-VEHICLE RENTAL | F0 | 0 | 0 | F3 | 0 | F5 | F6 | F7 | F8 | F9 |

CREDIBILITY EVALUATION DEVICE, METHOD OF EVALUATING CREDIBILITY, AND COMPUTER READABLE RECORDING MEDIUM

The present application claims priority to and incorporates by reference the entire contents of Japanese Patent Application No. 2018-192081 filed in Japan on Oct. 10, 2018.

BACKGROUND

The present disclosure relates to a credibility evaluation device, a method of evaluating credibility, and a computer readable recording medium.

In JP 2012-164210 A, a technique in a car-sharing service is proposed to provide differentiated services to users by acquiring vehicle travel information, and by scoring how much environmentally friendly the users drive cars, based on the vehicle travel information. In this technique, it is evaluated whether the users drive environmentally friendly, and based on a result of scoring, the contents of differentiated services, such as discounting of a car-sharing service price, are determined. Here, items to be scored include, for example, the amount of fuel used, a travel distance, and an average acceleration value.

Known social credit of a user which is used in a case of using a financial product, such as credit card or a loan, is evaluated by quantifying age, working style, annual income, and the like. However, applying the social credit of the user obtained in this manner, unfortunately, does not actually match the evaluation of the credibility of the user who uses, for example, a car-sharing service other than the above-mentioned financial products. This is because the above-mentioned social credit of the user only partially constitutes the evaluation required to use general services, such as a car-sharing service. Thus, it has been demanded to develop a technique capable of appropriately evaluating the credibility of a user by appropriately calculating the credibility of the user who uses a service which uses a structure provided with a communicable device, such as a vehicle for a car-sharing service.

There is a need for a credibility evaluation device, a method of evaluating credibility, and a computer readable recording medium which may more appropriately evaluate, in a service using a structure, the credibility of a user who uses the service provided in the structure.

SUMMARY

According to one aspect of the present disclosure, there is proceeded a credibility evaluation device for evaluating a credibility of a user who uses a service provided by a communicable structure, the credibility evaluation device including a processor including hardware, the processor being configured to: acquire structure information on the structure during and after use of the service by the user and third-party evaluation information including evaluation about the structure made by a third party other than the user after use of the service by the user; and calculate the credibility of the user, based on at least one of the structure information and the third-party evaluation information.

The above and other objects, features, advantages and technical and industrial significance of this disclosure will be better understood by reading the following detailed description of an exemplary embodiment of the disclosure, when considered in connection with the accompanying drawings.

DETAILED DESCRIPTION

An exemplary embodiment will be described below with reference to the drawings. Note that, in all drawings of the following exemplary embodiment, the same or corresponding portions are denoted by the same reference numerals. Furthermore, the present disclosure is not limited to the exemplary embodiment described below.

Figure 1:
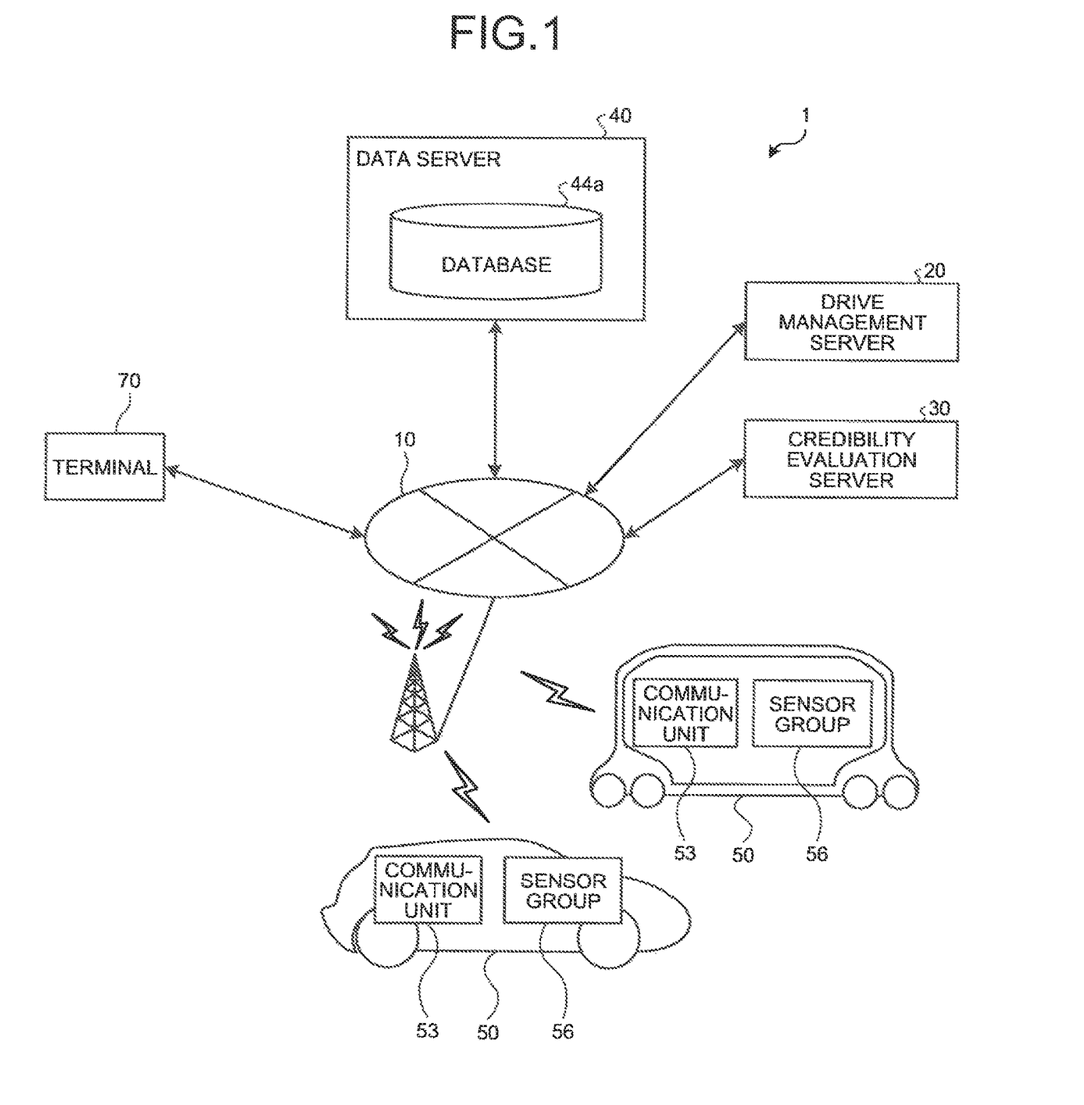
FIG. 1 is a schematic diagram illustrating a drive management system to which a credibility evaluation device according to an exemplary embodiment is applicable.

Firstly, a drive management system to which a credibility evaluation device according to an exemplary embodiment is applicable will be described. FIG. 1 is a schematic diagram illustrating a drive management system 1 to which a credibility evaluation device according to the exemplary embodiment is applicable. As illustrated in FIG. 1, the drive management system 1 includes a drive management server 20, a credibility evaluation server 30, a data server 40, vehicles 50 each including a communication unit 53 and a sensor group 56, and a user terminal device 70, which are communicable with each other via a network 10.

The network 10 includes an internet network, a mobile phone network, or the like. The network 10 includes, for example, a public communication network such as the Internet, and may include a wide area network (WAN), a telephone communication network such as a mobile phone, or another communication network, such as a wireless communication network including WiFi.

The drive management server 20 as a vehicle drive management device manages the traveling of the vehicles 50. Various types of drive information and vehicle information are supplied to the drive management server 20 from each of the vehicles 50 at predetermined timing. The drive information includes information on the drive of the vehicle 50, such as position information, speed information, and acceleration information, but is not necessarily limited to such information. The vehicle information includes information on a state of the vehicle 50, such as the amount of battery charge (SOC), the amount of remaining fuel, a current position, a vehicle interior state, and a vehicle exterior state, but is not necessarily limited to these items of information.

Figure 2:
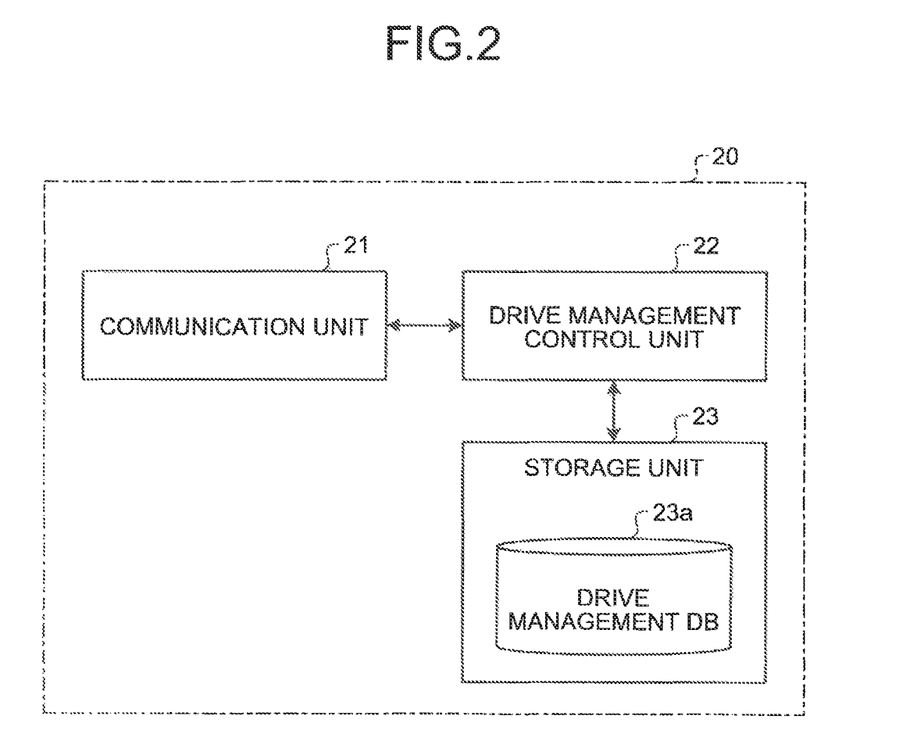
FIG. 2 is a block diagram schematically illustrating a configuration of a vehicle drive management device illustrated in FIG. 1.

FIG. 2 is a block diagram schematically illustrating a configuration of the drive management server 20. As illustrated in FIG. 2, the drive management server 20 has a general computer configuration communicable via the network 10. The drive management server 20 includes a communication unit 21, a drive management control unit 22, and a storage unit 23 that stores a drive management database 23*a*. The communication unit 21 is, for example, a local area network (LAN) interface board or a wireless communication circuit for wireless communication. The LAN interface board or the wireless communication circuit is connected to the network 10, such as the Internet, as a public communication network. The communication unit 21 is connected to the network 10 to communicate with the credibility evaluation server 30, the data server 40, the vehicles 50, and the user terminal device 70. The communication unit 21 receives, from the respective vehicles 50, vehicle identification information unique to the vehicle 50 or driving state information or transmits an instruction signal to the respective vehicles 50. The vehicle identification information includes information for individually identifying the respective vehicles 50. Furthermore, the communication unit 21 transmits information, to the user terminal device 70 of a user, at a time of using a vehicle 50, and receives various types of information including user identification information for identifying the user, from the user terminal device 70.

Specifically, the drive management control unit 22 includes a processor, such as a central processing unit (CPU), digital signal processor (DSP), or a field-programmable gate array (FPGA), and a main storage unit, such as a random access memory (RAM) and read only memory (ROM) (None of the processor and the main storage unit is illustrated). The storage unit 23 includes a storage medium selected from an erasable programmable ROM (EPROM), a hard disk drive (HDD), and a removable medium. The removable medium includes, for example, a universal serial bus (USB) memory or a disc recording medium, such as a compact disc (CD), digital versatile disc (DVD), or Blu-ray (registered trademark) Disc (BD). The storage unit 23 is configured to store an operating system (OS), various programs, various tables, various databases, and the like. The drive management control unit 22 loads a program stored in the storage unit 23 into a work area of the main storage unit and executes the program, and thus controls each component unit through execution of the program, achieving a function meeting a predetermined purpose.

The storage unit 23 includes the drive management database 23*a* in which various retrievable data are stored. The drive management database 23*a* includes, for example, a relational database (RDB). The database (DB) described below is constructed by managing data stored in the storage unit 23 by a program of a database management system (DBMS) executed by the above-mentioned processor. The drive management database 23*a* stores the user identification information and various types of necessary information (hereinafter, also referred to as user selection information) input or selected by the user to use a vehicle 50, in association with each other, in a retrievable manner. Furthermore, the drive management database 23*a* stores the vehicle identification information, drive information, and the like, in association with each other, in a retrievable manner.

The user identification information and the vehicle identification information are stored in the drive management database 23*a* in a retrievable manner, when assigned to the user and the vehicle 50, respectively. The user identification information includes various types of information for identifying each individual user. The user identification information is, for example, a user ID for identifying each individual user and is registered in association with user-specific information, such as the name and address of the user or position information, such as a longitude and latitude representing the position of the user. In other words, the user identification information includes information necessary to access the drive management server 20 upon transmission of information about the user. For example, when the user terminal device 70 transmits predetermined information such as the user selection information together with the user identification information to the drive management server 20, the drive management server 20 stores the predetermined information in association with the user identification information in the drive management database 23*a* of the storage unit 23, in a retrievable manner. Similarly, the vehicle identification information includes various types of information for identifying each individual vehicle 50. When the vehicle 50 transmits predetermined information such as the position information and vehicle information together with the vehicle identification information to the drive management server 20, the drive management server 20 stores the predetermined information in association with the vehicle identification information, in the drive management database 23*a*, in a retrievable manner.

Figure 3:
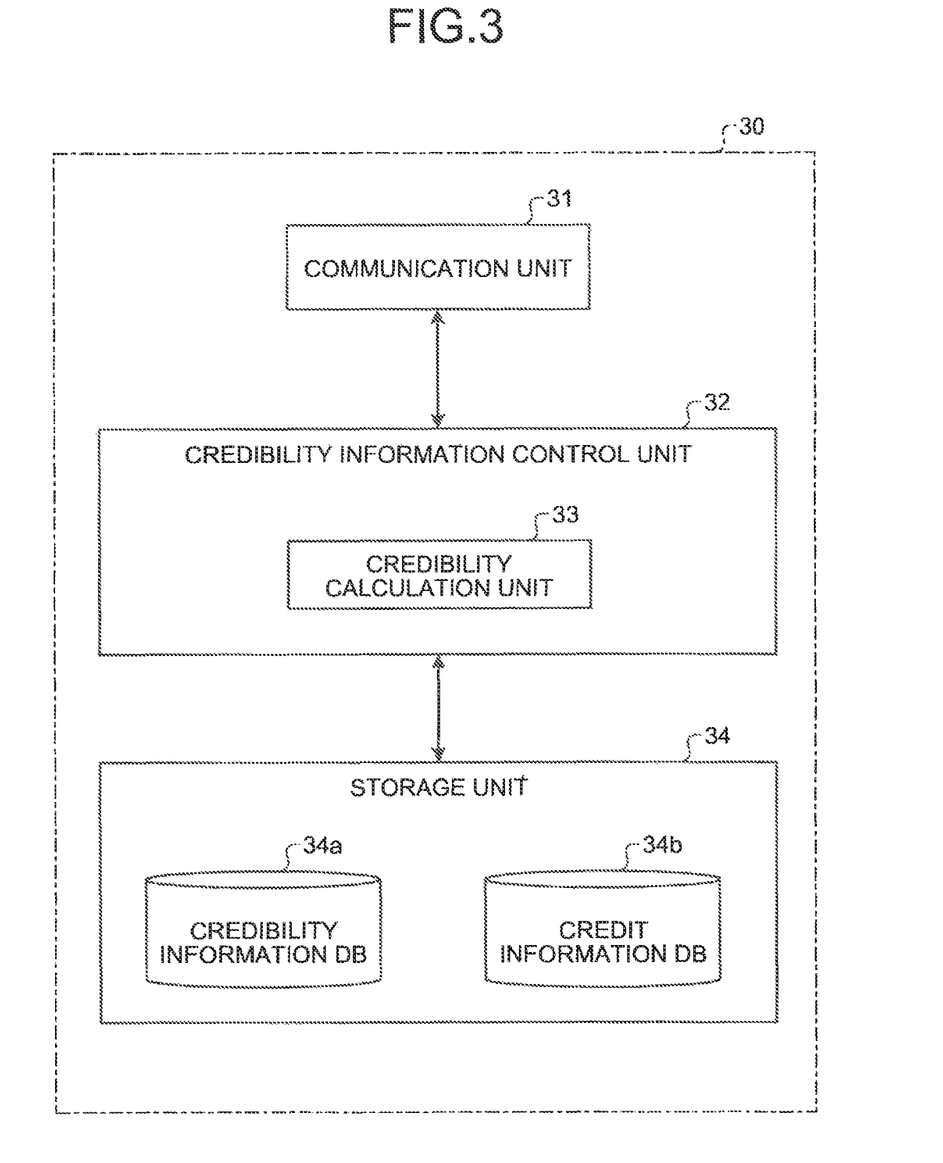
FIG. 3 is a block diagram schematically illustrating a configuration of the credibility evaluation device according to the exemplary embodiment illustrated in FIG. 1.

The credibility evaluation server 30 as the credibility evaluation device performs calculation processing for calculating the credibility of a user who uses a vehicle 50 as a structure having a communication function to perform credibility evaluation processing. To the credibility evaluation server 30, various types of information (hereinafter, credibility evaluation information) necessary for evaluation of the credibility of the user is supplied, from the drive management server 20 and the data server 40. FIG. 3 is a block diagram schematically illustrating a configuration of the credibility evaluation server 30.

As illustrated in FIG. 3, the credibility evaluation server 30 has a general computer configuration communicable via the network 10. The credibility evaluation server 30 includes a communication unit 31, a credibility information control unit 32 including a credibility calculation unit 33, and a storage unit 34.

The communication unit 31 as an information acquisition unit is similarly configured to the communication unit 21 described above, is connected to the network 10, and communicates with at least the drive management server 20 and the data server 40. The communication unit 31 may be configured to be communicable with a vehicle 50 and the user terminal device 70 as needed. The communication unit 31 transmits and receives at least part of the user identification information, user selection information, vehicle information, and drive information, described above, to and from the drive management server 20 and the data server 40.

The credibility information control unit 32 and the storage unit 34 are physically similar to the drive management control unit 22 and the storage unit 23 described above, respectively. The storage unit 34 stores a credibility information database 34*a* and a credit information database 34*b*. The credibility information database 34*a* stores the user identification information and various types of information including the credibility evaluation information of each user, in associated with each other, in a retrievable manner. The credit information database 34b stores the user identification information and information (credit information) on credit transactions of the user, such as credit card transaction or loan transaction, in association with each other, in a retrievable manner. Note that the credit information is also generally referred to as credit information. Furthermore, the credit information database 34b is not limited to the credit information database 34b provided in the credibility evaluation server 30. In other words, the credit information database 34b may be provided in the data server 40 other than the credibility evaluation server 30 or another server (not illustrated) to access data of the credit information stored in the other server via the network 10 as necessary.

The credit information stored in the credit information database 34b in a retrievable manner is updated, for example, when the user carries out credit transactions or the like. For example, after user's use of a service provided by the vehicle 50, the credibility evaluation information is supplied from the drive management server 20 or the data server 40 to the credibility evaluation server 30, stored in the credibility information database 34a, and updated.

The credibility evaluation information on a user who has used a service provided by a vehicle 50 as a communicable structure includes structure information and third-party evaluation information. The structure information includes use state information on the vehicle 50 during use of the service by the user, and structure state information indicating the state of the vehicle 50 after use of the service by the user. The third-party evaluation information includes information on an evaluation performed by a third party other than the user after use of the service by the user.

The use state information includes information on a driving behavior of the vehicle 50 or information on a behavior of the user as a driver driving the vehicle 50. The use state information specifically includes the information on a driving behavior of the vehicle 50, and the information on a behavior of the user driving the vehicle 50, such as the presence/absence or frequency of distracted driving, the presence/absence or frequency of driving while operating a portable terminal device or the like (hereinafter referred to as terminal operation), the presence/absence or extent of tailgating. Note that the use state information is not limited to such information.

The structure state information includes information on the state of a vehicle 50 after the user's use of the service provided by the vehicle 50. More specifically, the information on the state of a vehicle 50 includes information on the state of the interior of the vehicle, such as scattered waste and arrangement of a tool or baggage after the user's use of the service provided by the vehicle 50 (hereinafter referred to as vehicle interior information) and information on the state of the exterior of the vehicle 50 (hereinafter, referred to as vehicle exterior information). The information on the state of a vehicle 50 includes information on the amount of remaining fuel (hereinafter referred to as remaining fuel amount information), information on a return position where the user returns the vehicle 50 (hereinafter referred to as return position information), and information such as the presence/absence of a delay in scheduled time for the user to return the vehicle 50, delay time, and the presence/absence of information about the delay (hereinafter referred to as delay-related information). Note that, the structure information on the state of the vehicle 50 is not limited to such information. In other words, for example, information indicating that there is user's usage against rules on using service may be also added to the structure state information, against leakage of personal information or the like of another user by a user when the user directly hands over the vehicle 50 to the other user.

The third-party evaluation information includes information on evaluation of the state of a vehicle 50, made by another user who used the service provided by the vehicle 50, after the user's use of the service provided by the vehicle 50. The other user as the third party evaluates the state of the vehicle 50 returned to indirectly evaluate the user who has rented the vehicle 50 first by evaluating the state of the vehicle 50 after the return. Note that the other user as the third party may directly evaluate the user who has rented the vehicle 50. The state of the vehicle 50 represents, for example, smell or the like in the interior of the vehicle 50, but is not necessarily limited to the smell. Here, in addition to the other user, a manager who manages the vehicle 50, a cleaning person who cleaned the vehicle 50, or the like may evaluate the state of the returned vehicle 50. In other words, information on an evaluation made by the manager, worker, or the like may be provided as the third-party evaluation information.

Figure 4:
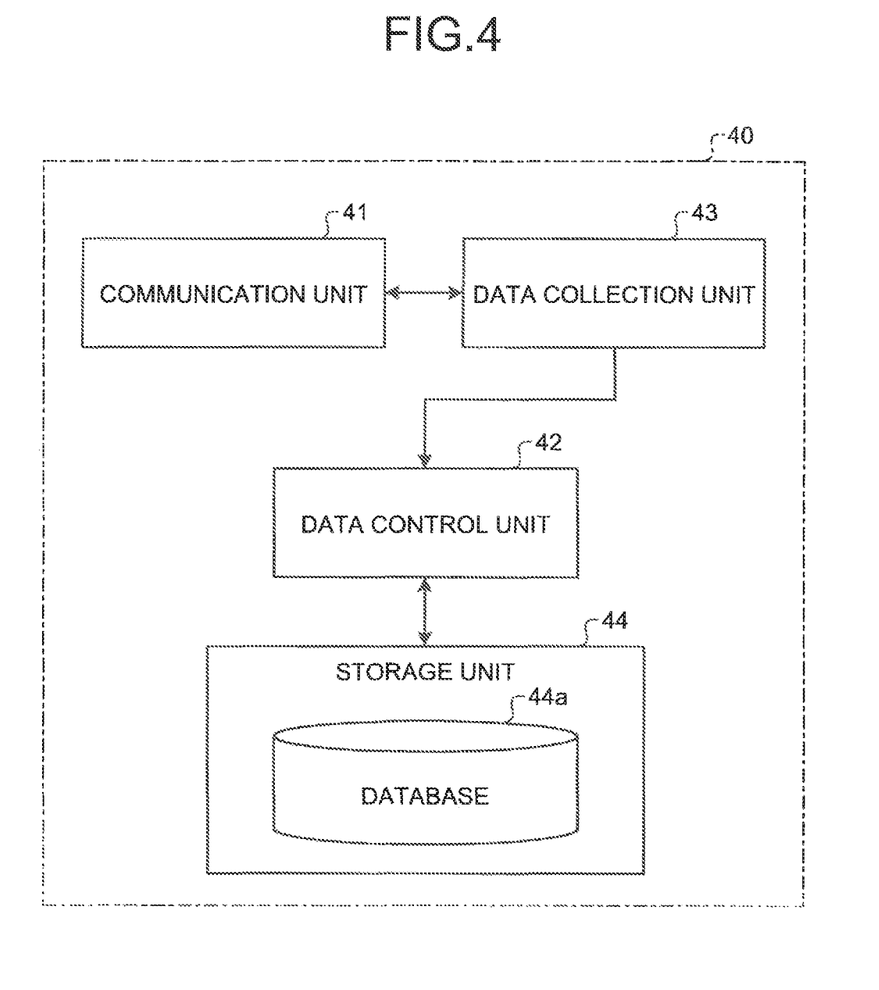
FIG. 4 is a block diagram schematically illustrating a configuration of a data server illustrated in FIG. 1.

The data server 40 performs data collection processing for collecting various types of information output from the vehicles 50 as the structure having a communication function. FIG. 4 is a block diagram schematically illustrating a configuration of the data server 40. As illustrated in FIG. 4, the data server 40 is configured to communicate via the network 10. The data server 40 includes a communication unit 41, a data control unit 42, a data collection unit 43, and a storage unit 44. The communication unit 41 is physically similar to the communication units 21 and 31 described above. The communication unit 41 is connected to the network 10 and communicates with at least the drive management server 20, the credibility evaluation server 30, and the vehicles 50. The communication unit 41 may communicate with the user terminal device 70.

The communication unit 41 transmits and receives at least part of the user identification information, user selection information, vehicle identification information, vehicle information, drive information, and credibility evaluation information, to and from the drive management server 20 and the credibility evaluation server 30. The communication unit 41 collects the drive information, such as position information, speed information, acceleration information, and drive plan information from each of the vehicles 50, based on a command signal from the data collection unit 43. The communication unit 41 further collects information on the driving behavior of the vehicle 50, and information on the driving by the user who drives the vehicle 50, such as the presence/absence or frequency of distracted driving, the presence/absence or frequency of the terminal operation, the presence/absence or extent of tailgating, and the like. The information transmitted and received by the communication unit 41 is not limited to such information. Moreover, when information is collected from a structure having a communication function other than the vehicle 50, the type and item of information to be collected may be appropriately determined according to the type of structure.

The data control unit 42 and the storage unit 44 are physically similar to the drive management control unit 22 and a storage unit 24 described above, respectively. As a database 44a including, for example, big data, the storage unit 44 stores various types of information collected in the past from the drive management server 20, the credibility evaluation server 30, and the vehicles 50 via the network 10.

Note that various types of information may be collected from each individual user terminal device 70.

Figure 5:
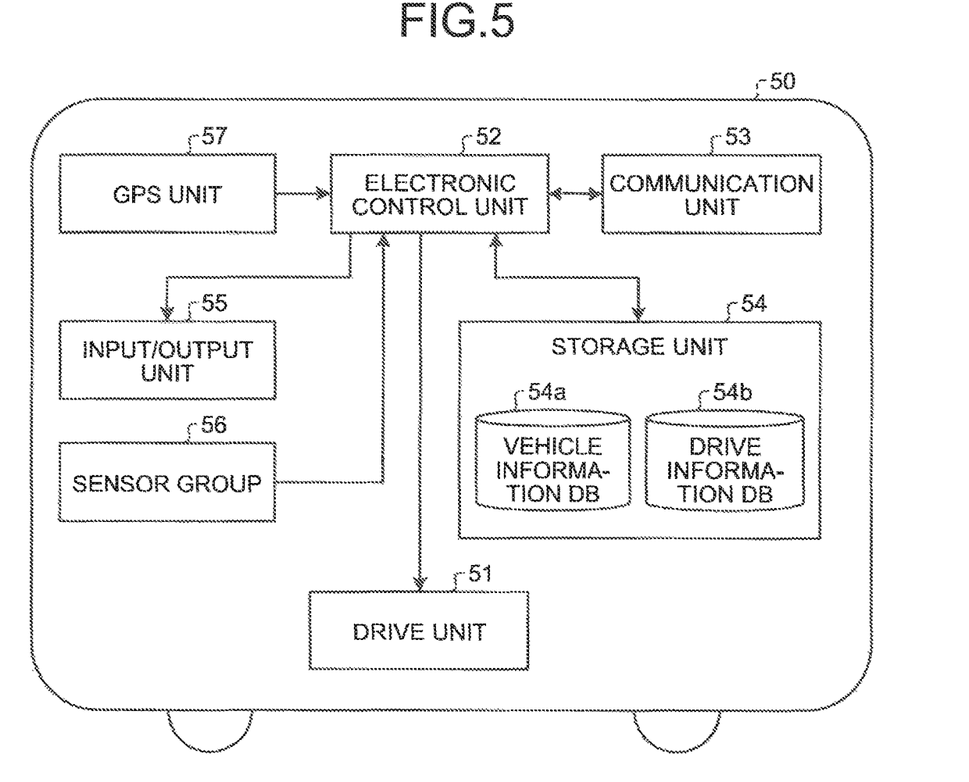
FIG. 5 is a block diagram schematically illustrating a configuration of in-vehicle devices mounted on a vehicle illustrated in FIG. 1.

The vehicles 50 as the mobile body include a vehicle which is driven by a driver or an autonomous vehicle configured to autonomously travel according to a given operation command. FIG. 5 is a block diagram schematically illustrating a configuration of each vehicle 50. As illustrated in FIG. 5, the vehicle 50 includes a drive unit 51, an electronic control unit 52, a communication unit 53, a storage unit 54, an input/output unit 55, a sensor group 56, and a GPS unit 57.

The drive unit 51 includes a known drive unit necessary for the traveling of the vehicle 50. Specifically, the vehicle 50 includes an engine as a drive source, and the engine is configured to burn fuel, drive a motor, and generate power. A rechargeable battery is charged with the generated electric power. Furthermore, the vehicle 50 includes a drive transmission mechanism for transmitting the driving force of the engine, a drive wheel for traveling, and the like.

The electronic control unit 52 and the storage unit 54 are physically similar to the drive management control unit 22 and the storage unit 24 described above, respectively. The electronic control unit 52 integrally controls the operations of various components mounted to the vehicle 50. The communication unit 53 includes, for example, a data communication module (DCM) communicating with at least the drive management server 20 by wireless communication via the network 10. The storage unit 54 includes a vehicle information database 54a and a drive information database 54b. The vehicle information database 54a stores various types of updatable information including the amount of battery charge, the amount of remaining fuel, a current position, and the like. The drive information database 54b stores various types of updatable data including the drive information provided from the drive management server 20.

The input/output unit 55 includes a touch panel display, a speaker/microphone, or the like. The input/output unit 55 as output means is configured to display characters and figures on a screen of a touch panel display or output voice from the speaker/microphone to notify predetermined information to the outside, under the control of the electronic control unit 52. The input/output unit 55 as input means is configured for the user or the like to operate the touch panel display or emit a sound to the speaker microphone to input predetermined information to the electronic control unit 52.

The sensor group 56 includes a vehicle speed sensor, a sensor for the traveling of the vehicle 50, such as an acceleration sensor, a vehicle interior sensor for detecting various conditions in the vehicle interior, and an imaging device, such as an imaging camera. The GPS unit 57 receives radio waves from a global positioning system (GPS) satellite (not illustrated) and detects the position of the vehicle 50. The detected position is stored as the position information of the vehicle information, in the vehicle information database 54a, in a retrievable manner. As a method of detecting the position of the vehicle 50, a method using light detection and ranging or laser imaging detection and ranging (LiDAR) combined with a three-dimensional digital map may be adopted.

The user terminal device 70 as a terminal to be used is operated by the user. The user terminal device 70 transmits, for example, various data via a communication application and various types of information, such as user information including the user identification information and user selection information via voice call, to the drive management server 20. The user terminal device 70 is configured to receive various types of information, such as drive plan information, vehicle assignment acceptance signal, and data of an electronic key, from the drive management server 20.

Figure 6:
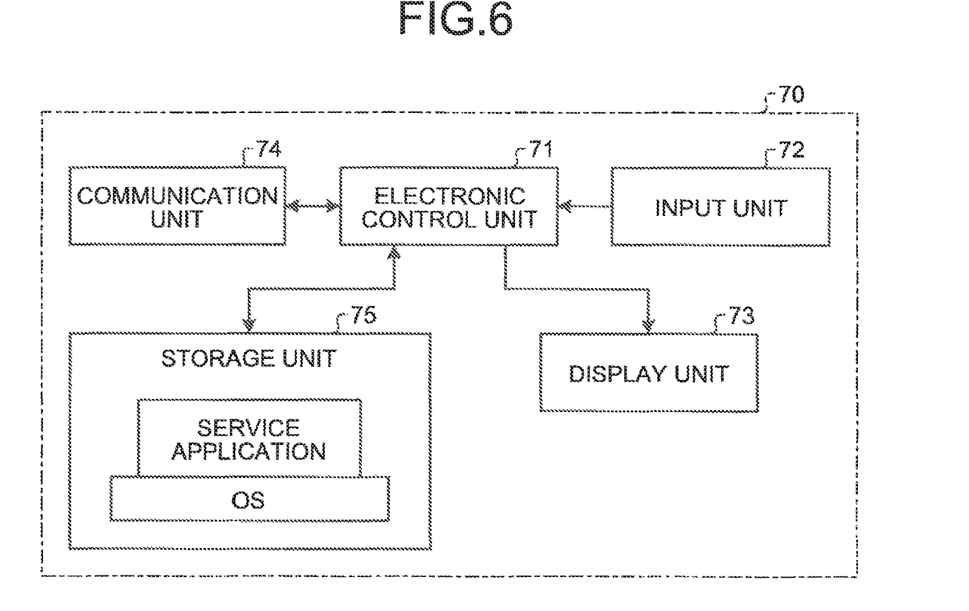
FIG. 6 is a block diagram schematically illustrating a configuration of a user terminal device illustrated in FIG. 1.

FIG. 6 is a block diagram schematically illustrating a configuration of the user terminal device 70 illustrated in FIG. 1.

As illustrated in FIG. 6, the user terminal device 70 includes an electronic control unit 71, an input unit 72, a display unit 73, a communication unit 74, and a storage unit 75, which are communicably connected to each other. The electronic control unit 71, the communication unit 74, and the storage unit 75 are physically similar to the drive management control unit 22, the communication unit 21, and the storage unit 24 described above, respectively. The electronic control unit 71 integrally controls the operations of the input unit 72, the display unit 73, the communication unit 74, and the storage unit 75 by executing various application programs. The communication unit 74 transmits and receives various types of information, such as user identification information, user selection information, drive plan information, and voice data to and from an external server, for example, the drive management server 20 via the network 10. The storage unit 75 is configured to store the user identification information.

The input unit 72 includes, for example, a keyboard, a touch panel keyboard incorporated in the display unit 73 to detect a touch operation on the display panel or an audio input device enabling a call with the outside. Here, the call with the outside includes not only a call with another user terminal device 70 but also, for example, a call with an operator resident at the drive management server 20 or a call with an artificial intelligence system. The display unit 73 includes, for example, an organic EL panel or a liquid crystal display panel, and notifies information to the outside by displaying characters, figures, and the like on the display panel. Note that the input unit 72 and the display unit 73 may be configured similarly to the input/output unit 55 described above.

Specifically, the user terminal device 70 described above may adopt a mobile phone, such as a smartphone, an information terminal, such as a tablet, a personal computer, or the like. Note that a desktop type personal computer installed at home or the like, a fixed telephone installed at home or the like may also be used.

Figure 7:
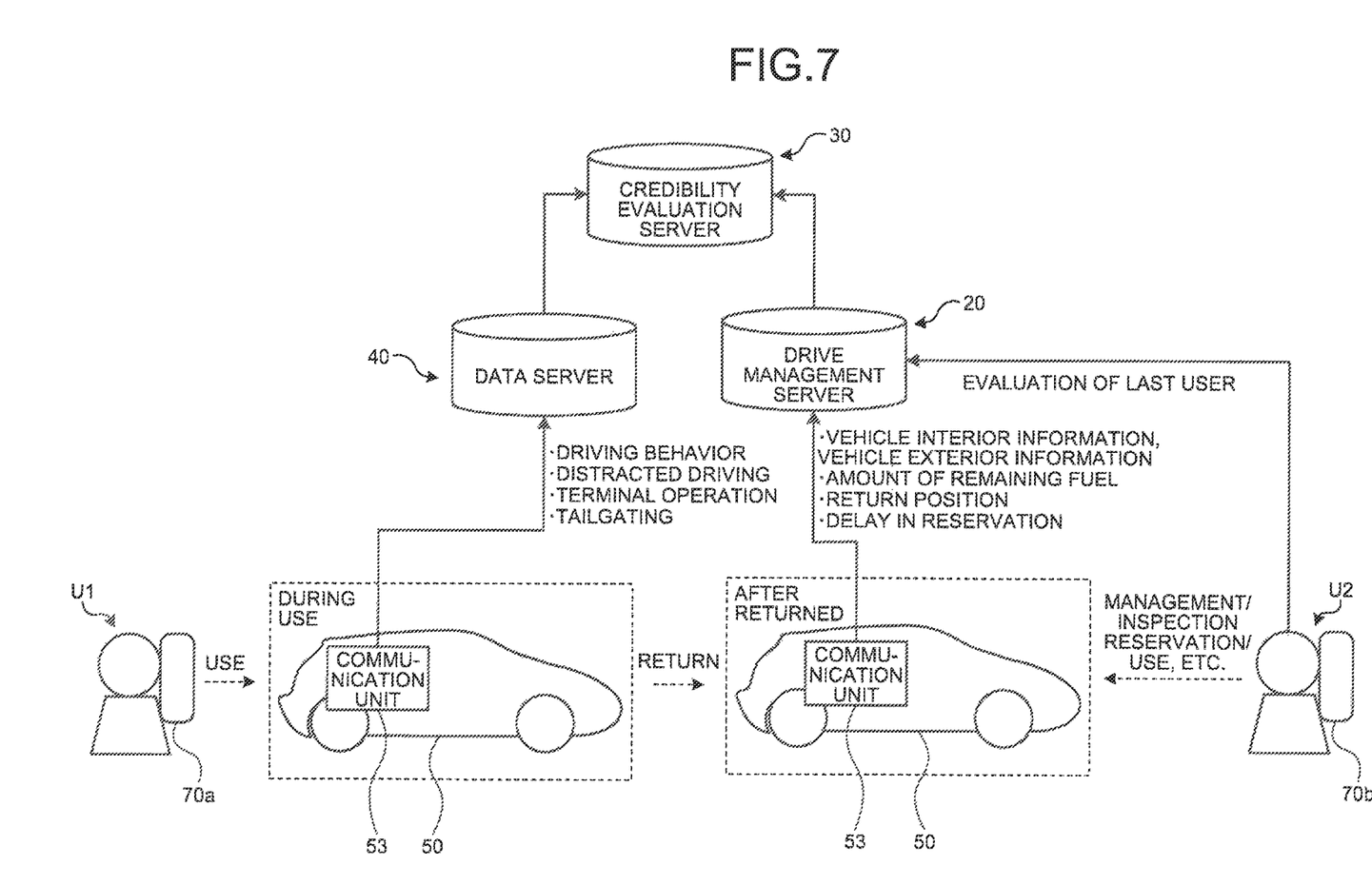
FIG. 7 is a schematic diagram illustrating a method of evaluating credibility according to the exemplary embodiment.

Next, a method of evaluating credibility executed in the credibility evaluation server 30 of the drive management system 1, described above, will be described. FIG. 7 is a schematic diagram illustrating the method of evaluating credibility according to the exemplary embodiment. In the method of evaluating credibility, a car-sharing service used as the service will be described as an example. In this example, a description will be made of a case where after a user U1 returns a rented vehicle 50, a user U2 who is a third party different from the user U1 rents the vehicle 50. In the following description, transmission and reception of information are performed via the network 10, but repetitive description on this point will be omitted.

As illustrated in FIG. 7, the user U1 who possesses a user terminal device 70a rents a predetermined vehicle 50 from the car-sharing service. At this time, the user terminal device 70a transmits user identification information of the user U1 and vehicle identification information of the vehicle 50, associated with each other, for example, to the drive management server 20. The drive management server 20 includes, for example, a server of a provider of the car-sharing service. Here, if the user U1 is late for the time to hand over the vehicle 50 or does not transmit information about the delay to the drive management server, information indicating that there is usage against rules on using service is added to delay-related information.

While the user U1 uses the service provided by the vehicle 50 rented, the communication unit 53 of the vehicle 50 periodically transmits the vehicle identification information and various types of information to the data server 40. The various types of information includes, for example, information about the traveling of the vehicle 50 and driving by the user, specifically, the use state information, such as a driving behavior of the vehicle 50, the presence/absence or frequency of distracted driving, the presence/absence or frequency of terminal operation, the presence/absence or extent of tailgating, and the like. Furthermore, the communication unit 53 may supply vehicle information of the vehicle 50 to the data server 40. The data server 40 associates various types of information supplied from the vehicle 50 with the vehicle identification information and stores the information in the database 44a of the storage unit 44. The data server 40 associates the use state information with the user identification information of the user U1 and supplies the information to the credibility evaluation server 30.

When the user U1 finishes using the service provided by the vehicle 50, the user U1 moves and returns the vehicle 50 to a predetermined return position, based on a predetermined rule on using the car-sharing service. When the user U1 returns the vehicle 50 to a place other than the predetermined return position, information indicating that there is usage against the rules on using service is added to the return position information. When the return time for the user U1 to return the vehicle 50 is late for scheduled return time which has been determined in advance, information indicating that there is usage against rules on using service is added to the delay-related information. In a case where the rules on using service include a rule to refill with fuel to an extent substantially the same as that at the start of a rental upon returning the vehicle 50, when the amount of remaining fuel upon returning is less than a predetermined percentage of the amount of remaining fuel at the start of the rental, information indicating that there is usage against rules on using service is added to the remaining fuel amount information.

After the vehicle 50 is returned, the sensor group 56 measures or images various types of information, such as the vehicle interior information, vehicle exterior information, remaining fuel amount information, return position information, and delay-related information, and the communication unit 53 transmits, as the structure state information, the various types of information to the drive management server 20.

Thereafter, the vehicle 50 is delivered to the user U2 in a predetermined manner. The user U2 who has taken over the vehicle 50 uses a service application of the car-sharing service in a user terminal device 70b to evaluate the state of the vehicle 50 at an appropriate timing. Thereby, the user U1 who has used the vehicle 50 last time is evaluated. The user terminal device 70b transmits, as the third-party evaluation information, the input evaluation information on the user U1 to the drive management server 20. The drive management server 20 transmits the structure state information and the third-party evaluation information which are supplied from the vehicle 50 and the user terminal device 70b to the credibility evaluation server 30, in association with the user identification information of the user U1. The structure state information and the third-party evaluation information may be further transmitted to the credibility evaluation server 30, in association with the vehicle identification information. In addition to the next user U2, the third party who carries out the evaluation may be a manager who manages the vehicle 50, an inspector who inspects the vehicle 50, or a worker who cleans or washes the vehicle 50.

Figure 8:
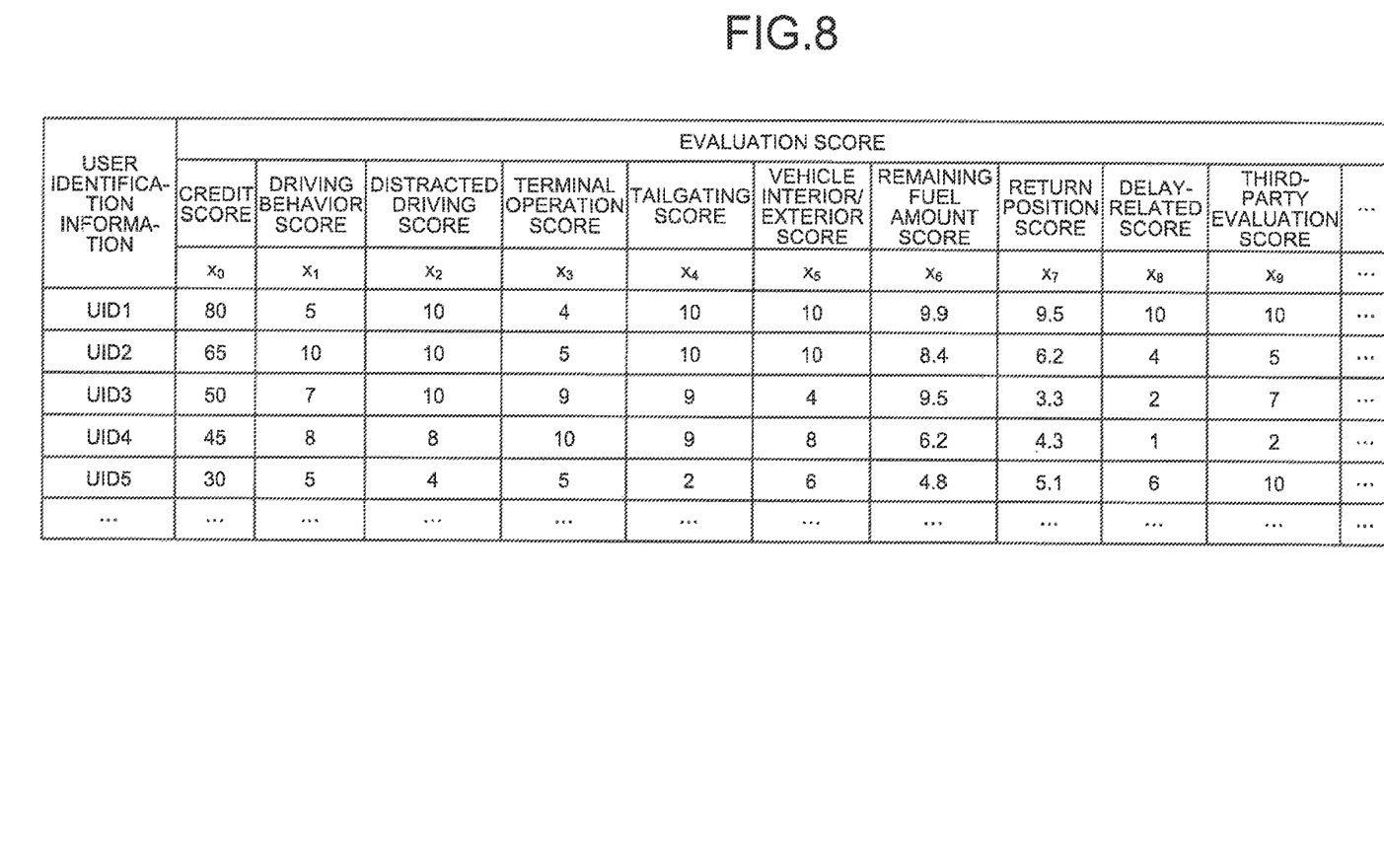
FIG. 8 is a table illustrating an example of evaluation scores for each user, evaluated by a credibility evaluation device according to the exemplary embodiment.

The credibility evaluation server 30 calculates the credibility of a user who has used the service provided by the vehicle 50, based on the supplied use state information, structure state information, and third-party evaluation information and evaluates the credibility of the user. Hereinafter, a specific example of the method of evaluating credibility will be described. FIG. 8 is a table illustrating an example of evaluation scores for each user, based on the use state information, structure state information, and third-party evaluation information, which are described above. The data of the table illustrated in FIG. 8 is stored in the storage unit 34 of the credibility evaluation server 30.

When credit information on a credit transaction about the user U1 is transmitted from the data server 40 or a server (not illustrated) of each of financial institutions to the credibility evaluation server 30, the credibility information control unit 32 updates the credit information about the user U1 in the credit information database 34b. The credit information includes a credit score $x_0$ which is a score based on the credit information on credit transaction, such as well-known credit card transaction. The example illustrated in FIG. 8 indicates that the credit score $x_0$ of the user U1 having user identification information UID1 is "80". The highest point and the lowest point of each evaluation score may be set appropriately.

When the use state information on the user U1 is transmitted from the data server 40 to the credibility evaluation server 30, the credibility information control unit 32 updates the use state information on the user U1 in the credibility information database 34a. Specifically, when, for example, driving behavior information is input to the credibility evaluation server 30 as one of the use state information, a driving behavior score $x_1$ in the credibility information database 34a is updated. The driving behavior score $x_1$ includes a score based on the driving behavior of the vehicle 50 such as acceleration/deceleration or the number of times of lane change.

Similarly, based on the updated use state information on the user U1 having the user identification information UID1, a distracted driving score $x_2$ based on distracted-driving information, a terminal operation score $x_3$ based on terminal operation information, and a tailgating score $x_4$ based on tailgating information are updated. As the distracted-driving score $x_2$, for example, the frequency of or the number of times of distracted driving may be adopted. As the terminal operation score $x_3$, for example, the total operation time of terminal operation while the vehicle 50 is traveling, the number of times of movement of the line of sight to the terminal device of the user U1, or the like may be adopted. As the tailgating score $x_4$, a score calculated from the degree of increase or decrease of the distance to another vehicle traveling ahead measured by the sensor group 56 and the magnitude of the acceleration/deceleration of the vehicle 50 may be adopted.

When structure state information and third-party evaluation information are transmitted from the drive management server 20 to the credibility evaluation server 30, the credibility information control unit 32 updates the structure state information and the third-party evaluation information about the user U1, which are in the credibility information database 34a. Specifically, when, for example, vehicle interior information and vehicle exterior information (hereinafter referred to as vehicle interior/exterior information) are input to the credibility evaluation server 30 as one of the structure state information, a vehicle interior/exterior score $x_5$ in the credibility information database 34a is updated. As the vehicle interior/exterior score $x_5$, for example, a score calculated from the amount of new waste scattered or the area of new dirt on the exterior may be adopted, based on the state of the vehicle interior and exterior detected by the sensor group 56 of the vehicle 50, before and after the user U1 uses the vehicle 50. Note that calculation processing may be separately performed on the input vehicle interior information and the input vehicle exterior information.

Similarly, based on the updated structure state information on the user U1 having the user identification information UID1, a remaining fuel amount score $x_6$ based on the remaining fuel amount information, a return position score $x_7$ based on the return position information, and a delay-related score $x_8$ based on the delay-related information are updated. Furthermore, based on the updated third-party evaluation information on the user U1 having the user identification information UID1, a third-party evaluation score $x_9$ is updated. As the remaining fuel amount score $x_6$, for example, the percentage of the amount of remaining fuel in the vehicle 50 may be adopted. As the return position score $x_7$, for example, the distance between an actual return position to which the user returned the vehicle 50 and a return position based on the rules on using service may be adopted. As the delay-related score $x_8$, for example, at least one item of information selected from a delay time from a scheduled reception time when the user came to receive the vehicle 50, and a score of the presence/absence of information about the delay may be adopted. As the third-party evaluation score $x_9$, an evaluation score or the like to the user U1 by a third party may be adopted. At that time, the third-party evaluation score $x_9$ may be calculated by further using various evaluation scores about the third party itself. Note that, the evaluation scores are not limited to the above-mentioned evaluation scores $x_0$ to $x_9$, and other various evaluation scores may be adopted as needed.

In the credibility evaluation server 30, the credibility calculation unit 33 performs a calculation based on an evaluation function as a predetermined function set for each type of service, based on various evaluation scores $x_i$ (i=0, N; N is a positive integer) represented by the evaluation scores $x_0$ to $x_9$ described above. In other words, when the service provided by the vehicle 50 includes a car-sharing service as in the present embodiment, the credibility calculation unit 33 calculates the credibility of a user by performing a calculation according to the following Formula (1), based on an evaluation function $f_1$ in the car-sharing service.

$$\text{Credibility of a user} = f_1(x_0, x_1, \ldots x_N) \quad (1)$$

Furthermore, when the service provided by the vehicle 50 is a service other than the car-sharing service, for example, a ride-sharing service, car rental service, accommodation vehicle rental service, or autonomous-vehicle rental service, an evaluation function $f_j$ (j is a natural number) is set in advance for each type of service. The credibility calculation unit 33 performs a calculation according to the following Formula (2) for each of various evaluation scores $x_0$ to $x_n$ based on the evaluation function $f_j$ defined corresponding to the type of service, and thereby the credibility of the user is calculated.

$$\text{Credibility of a user} = f_j(x_0, x_1, \ldots x_N) \quad (2)$$

Figure 9:
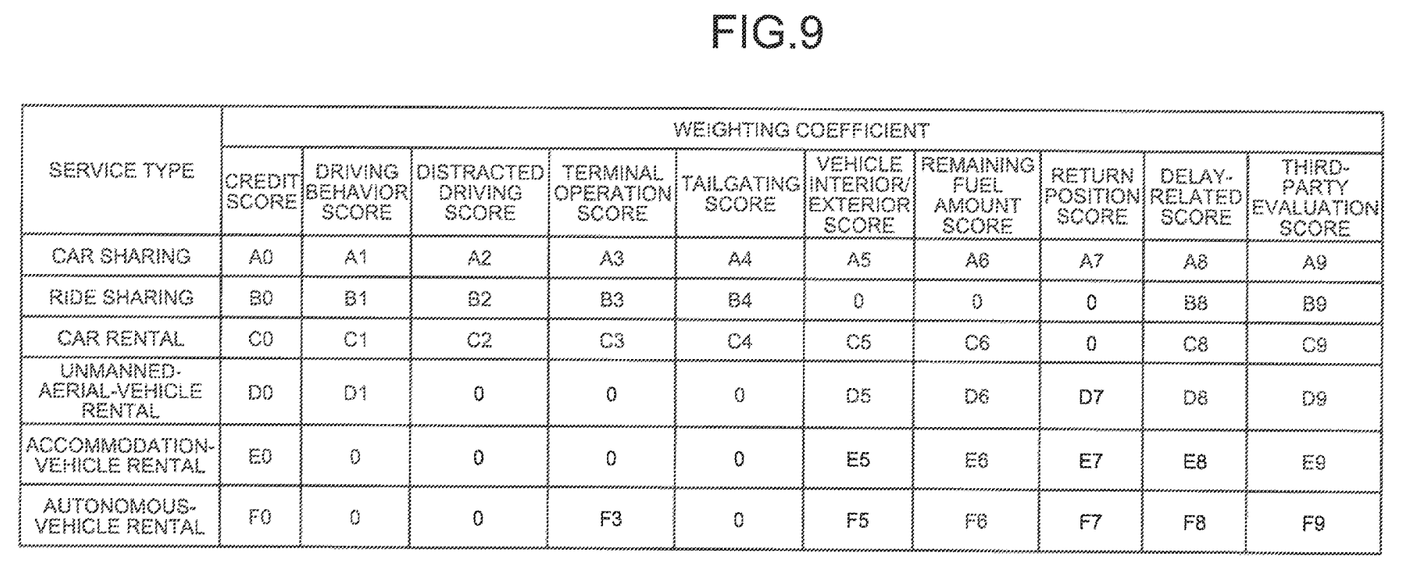
FIG. 9 is a table illustrating an example of weighting coefficients for each type of service, evaluated by a credibility evaluation device according to the exemplary embodiment.

Next, a specific example of an evaluation function for calculating the credibility of the user described above will be described. The following Formula (3) shows, for example, an example of the evaluation function $f_1$ shown in Formula (1) based on the car-sharing service. FIG. 9 is a table showing an example of weighting coefficients of the evaluation scores $x_0$ to $x_9$ for each type of service, corresponding to the following Formula (3). The data of the table illustrated in FIG. 9 is stored in the storage unit 34 of the credibility evaluation server 30.

$$\text{Credibility of a user} = f_1(x_0, x_1, \ldots, x_i, \ldots x_9) = \Sigma_{i=0} \text{ to } _9 A i \cdot x_i \quad (3)$$

Note that $\Sigma_{i=0}$ to $_9$ represents a sum of i=0 to i=9 in $A_i$ and $x_i$.

In the car-sharing service according to the present embodiment, when the evaluation function $f_1$ is applied to Formula (3), the weighting coefficients A1 to A9 may be adjusted so as to be set to high values for an important evaluation score $x_i$ and low values for an evaluation score $x_i$ having a low level of importance.

In the car-sharing service, the credibility of the user U1 may be calculated by the evaluation function $f_1$ applied to Formula (3) in which the weighting coefficients are set as described above. In other words, the credibility calculation unit 33 calculates the credibility of the user U1 who has used the service provided by the vehicle 50, according to Formula (3) which uses weighting coefficients illustrated in FIG. 9, for each of the evaluation scores $x_0$ to $x_9$ illustrated in FIG. 8. Thereby, the credibility evaluation server 30 evaluates the credibility of the user U1 who has used the car-sharing service.

Furthermore, for example, in the case of ride-sharing service other than the car-sharing service, the evaluation function $f_j$ set to Formula (3) enables, for example, the weighting coefficients of the vehicle interior/exterior score, remaining fuel amount score, and return position score to be set to zero. Thus, in Formula (3), the setting of the weighting coefficients suitable for the ride-sharing service enables to set the evaluation function $f_j$ suitable for the ride-sharing service. Note that, likewise in the other services, the weighting coefficients are set, and thus the evaluation function $f_j$ may be set more suitably. Therefore, it is possible to more appropriately evaluate the user U1 according to the type of service.

The credibility of the user U1 calculated as described above is stored in the credibility information database 34a of the credibility evaluation server 30, in association with the user identification information UID1. The credibility of the user U1 stored in the credibility information database 34a of the credibility evaluation server 30 may be readable in response to a request signals from terminals and servers of various business entities. Thus, the credibility of the user U1 which is requested by the various business entities may be used, for example, to evaluate reduction of insurance premium, such as automobile insurance, determination of whether to make a loan contract, reduction of vehicle purchase price, reduction of lease price, reduction of sharing price, reduction of rental price, and the like. Furthermore, according to the credibility of the predetermined user U1, the various business entities may select, limit, and cancel services which the user U1 is available, determine the price of services, or provide additional service such as provision of coupons relating to services.

In the exemplary embodiment described above, a program capable of executing the method of evaluating credibility may be recorded on a recording medium configured to be read by a computer or the like, in a computer, another machine, or a device (hereinafter referred to as a computer or the like). The computer or the like is caused to read and execute the program on the recording medium, and the computer functions as the credibility evaluation server 30. Here, the recording medium readable by a computer or the like includes a non-transitory recording medium configured to electrically, magnetically, optically, mechanically, or chemically store information, such as data or programs, so as to be read by a computer or the like. Such recording media include recording media removable from computers or the like, such as, flexible disks, magneto-optical disks, CD-ROMs, CD-R/Ws, DVDs, BDs, DATs, magnetic tapes, and memory cards such as flash memories. Furthermore, recording media fixed to computers or the like include hard disks, ROMs, and the like. Furthermore, an SSD may be used as a recording medium removable from a computer or the like or as a recording medium fixed to a computer or the like.

According to the above-described exemplary embodiment, the credibility is calculated from the evaluation scores of the credibility of a user who has used a service, based on the remaining fuel amount information, return position information, and delay-related information, which are the structure state information after use of the service, and information including the third-party evaluation information after use of the service, and thus, the credibility of the user who uses the service using the vehicle 50 may more appropriately evaluated.

The present disclosure is not limited to the exemplary embodiment described above, and various modifications may be made within the technical scope. For example, numerical values or information types described in the exemplary embodiment described above are provided by way of examples only, and numerical values or information types different therefrom may be used if necessary.

In the exemplary embodiment described above, the drive management server 20, the credibility evaluation server 30, and the data server 40 are separate from each other but may be configured by a single server. Furthermore, two of these servers may be configured by a single server so as to be separate from the other server.

In the exemplary embodiment described above, the vehicle 50 adopted as the structure having a communication function has been described as an example, but the structure having a communication function is not necessarily limited to the vehicle 50, and various structures, such as electric appliances and accommodation facility rooms, may be adopted as the structure having a communication function. Moreover, when these structures are adopted, it is possible to adopt, as credibility evaluation information on the structures, information about evaluation items based on an index suitable for each structure.

In the exemplary embodiment described above, the car-sharing service has been described as an example of a service, but various services may be adopted as long as the services use a mobile body as the structure. Specifically, as illustrated in FIG. 9, services, such as ride-sharing service, car rental service, unmanned-aerial-vehicle rental service, accommodation-vehicle rental service, and autonomous vehicle rental service may be adopted. The present disclosure may also be applied to bicycle-sharing service, aircraft rental service, service for using real estate such as a hotel, and the like.

According to the credibility evaluation device, the method of evaluating credibility, and the computer readable recording medium, after the user's use of a service provided by using a communicable structure, the credibility of the user who has used the service is calculated, based on a state of the structure and an evaluation by the third party, and the credibility of the user who has used the service provided by the structure may be more appropriately evaluated.

The information representing a state after use of the service is included as the structure state information so that the service may motivate the user to take action for an easy transition to the next user who is to use the service.

It is possible to calculate the credibility of the user suitable for each service for each type of service, and the credibility of the user may be evaluated more appropriately.

It is possible to appropriately evaluate the credibility of the user for various services using mobile bodies. Thus, the use state information including items of safe driving may motivate the user who uses the vehicle to drive safely. Thereby, a plurality of users may use the same vehicle, increasing the utilization of the vehicle.

Although the disclosure has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A credibility evaluation device for evaluating a credibility of a user who uses a service provided by an autonomous vehicle, the credibility evaluation device comprising:
a processor comprising hardware, the processor being configured to:
receive vehicle information on the autonomous vehicle during and after use of the service by the user and third-party evaluation information including evaluation about the autonomous vehicle made by a third party other than the user after use of the service by the user, the vehicle information including at least information received from a plurality of sensors of the autonomous vehicle during and after use of the service;
store the vehicle information in a memory; and
calculate the credibility of the user, based on the vehicle information and the third-party evaluation information, wherein
the vehicle information including at least the information received from the sensors of the autonomous vehicle is periodically received from the autonomous vehicle at a predetermined timing, the autonomous vehicle being configured to autonomously travel according to an operation command,
each time the processor receives the vehicle information, the processor updates the vehicle information stored in the memory,
the credibility of the user is calculated using the updated vehicle information and the third-party evaluation information,
the credibility of the user is calculated as a function of a plurality of scores that are based on the received vehicle information and the received third-party evaluation information, the plurality of scores including at least a terminal operation score, a vehicle interior/exterior score, a remaining fuel amount score, a return position score, a delay- related score, and a third-party evaluation score,
a respective weighting coefficient is set for each of the plurality of scores according to the service,
the sensors include a GPS unit, a vehicle interior sensor and an imaging camera,
the terminal operation score is calculated, using the information received from the sensors, based on a number of times of movement of the line of sight of the user to a terminal device of the user, and the return position score is calculated, using the information received from the sensors, based on a distance between a predetermined return position and an actual return position of the autonomous vehicle.

2. The credibility evaluation device according to claim 1, wherein
the vehicle information includes use state information on the autonomous vehicle during use of the service by the user, and vehicle state information indicating a state of the autonomous vehicle after use of the service by the user.

3. The credibility evaluation device according to claim 2, wherein
the vehicle state information includes at least one of information on a state of the outside of the autonomous vehicle, information on a state of the inside of the autonomous vehicle, and information on use against rules on using the service, after use of the service by the user.

4. The credibility evaluation device according to claim 2, wherein
the use state information includes information on a driving behavior of the autonomous vehicle.

5. A method of evaluating a credibility of a user who uses a service provided by an autonomous vehicle, the method comprising:
receiving vehicle information on the autonomous vehicle during and after use of the service by the user and third-party evaluation information including evaluation about the autonomous vehicle made by a third party other than the user after use of the service by the user, the vehicle information including at least information received from a plurality of sensors of the autonomous vehicle during and after use of the service;
storing the vehicle information in a memory; and
calculating the credibility of the user, based on the vehicle information and the third- party evaluation information to evaluate the user, wherein
the vehicle information including at least the information received from the sensors of the autonomous vehicle is periodically received from the autonomous vehicle at a predetermined timing, the autonomous vehicle being configured to autonomously travel according to an operation command,
each time the vehicle information is received, the vehicle information stored in the memory is updated,
the credibility of the user is calculated using the updated vehicle information and the third-party evaluation information,
the credibility of the user is calculated as a function of a plurality of scores that are based on the received vehicle information and the received third-party evaluation information, the plurality of scores including at least a terminal operation score, a vehicle interior/exterior score, a remaining fuel amount score, a return position score, a delay- related score, and a third-party evaluation score,
a respective weighting coefficient is set for each of the plurality of scores according to the service,
the sensors include a GPS unit, a vehicle interior sensor and an imaging camera,
the terminal operation score is calculated, using the information received from the sensors, based on a number of times of movement of the line of sight of the user to a terminal device of the user, and
the return position score is calculated, using the information received from the sensors, based on a distance between a predetermined return position and an actual return position of the autonomous vehicle.

6. A non-transitory computer-readable recording medium on which a program for evaluating a credibility of a user who uses a service provided by an autonomous vehicle is recorded, the program instructing a processor to execute:
receiving vehicle information on the autonomous vehicle during and after use of the service by the user and third-party evaluation information including evaluation about the autonomous vehicle made by a third party other than the user after use of the service by the user, the vehicle information including at least information received from a plurality of sensors of the autonomous vehicle during and after use of the service;
storing the vehicle information in a memory; and
calculating the credibility of the user, based on the vehicle information and the third- party evaluation information to evaluate the user, wherein
the vehicle information including at least the information received from the sensors of the autonomous vehicle is periodically received from the autonomous vehicle at a predetermined timing, the autonomous vehicle being configured to autonomously travel according to an operation command,
each time the processor receives the vehicle information, the processor updates the vehicle information stored in the memory,
the credibility of the user is calculated using the updated vehicle information and the third-party evaluation information, the credibility of the user is calculated as a function of a plurality of scores that are based on the received vehicle information and the received third-party evaluation information, the plurality of scores including at least a terminal operation score, a vehicle interior/exterior score, a remaining fuel amount score, a return position score, a delay-related score, and a third-party evaluation score,
a respective weighting coefficient is set for each of the plurality of scores according to the service,
the sensors include a GPS unit, a vehicle interior sensor and an imaging camera,
the terminal operation score is calculated, using the information received from the sensors, based on a number of times of movement of the line of sight of the user to a terminal device of the user, and
the return position score is calculated, using the information received from the sensors, based on a distance between a predetermined return position and an actual return position of the autonomous vehicle.

* * * * *